J. W. WHITE.
SECTIONAL WHEEL RIM.
APPLICATION FILED JUNE 27, 1919.
1,340,094.
Patented May 11, 1920.
2 SHEETS—SHEET 1.
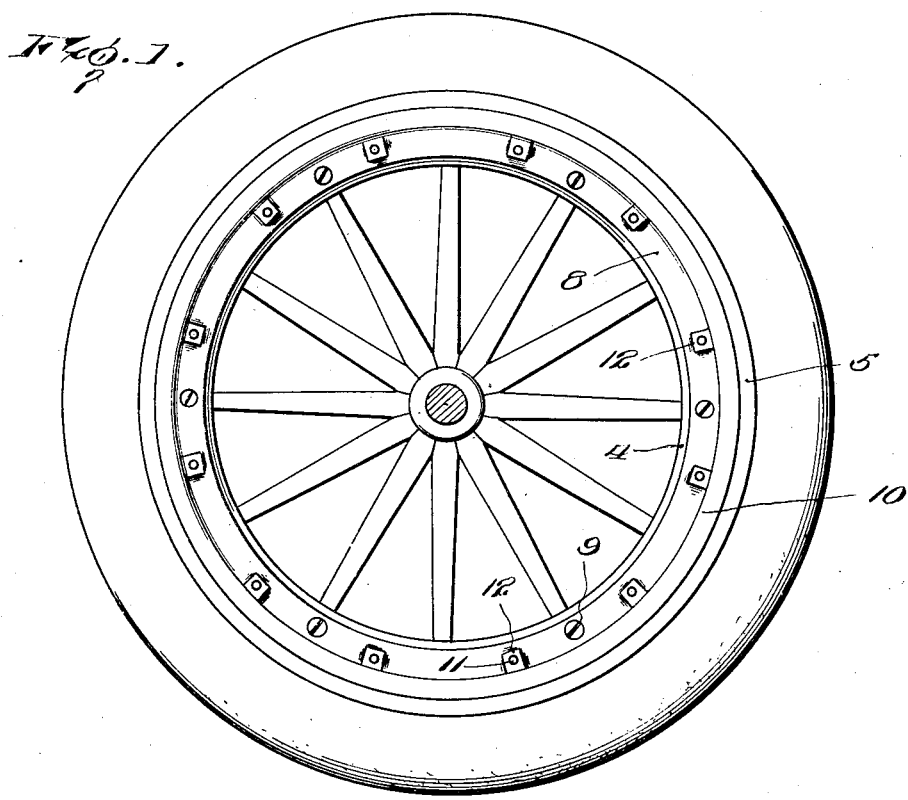
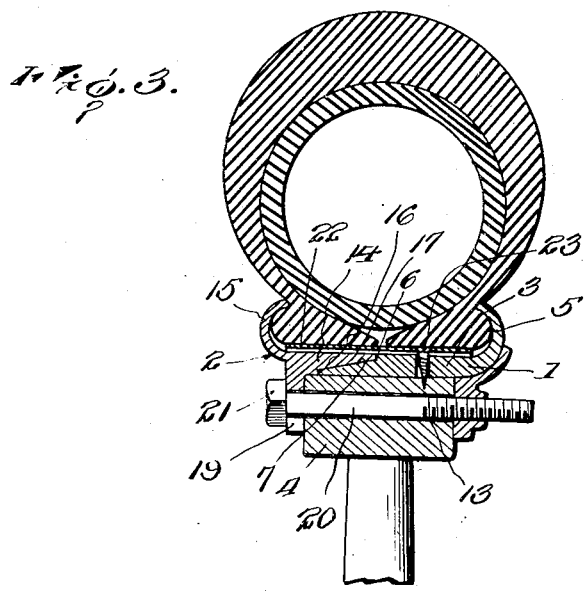
Inventor:
J. W. White.
by
Attorney.

J. W. WHITE.
SECTIONAL WHEEL RIM.
APPLICATION FILED JUNE 27, 1919.
1,340,094.
Patented May 11, 1920.
2 SHEETS—SHEET 2.
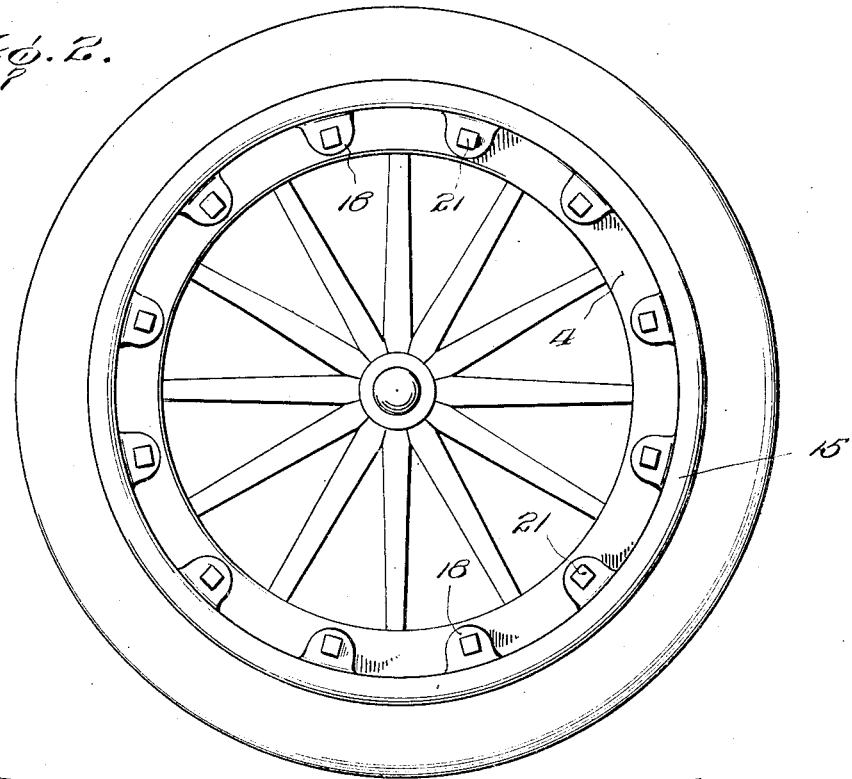
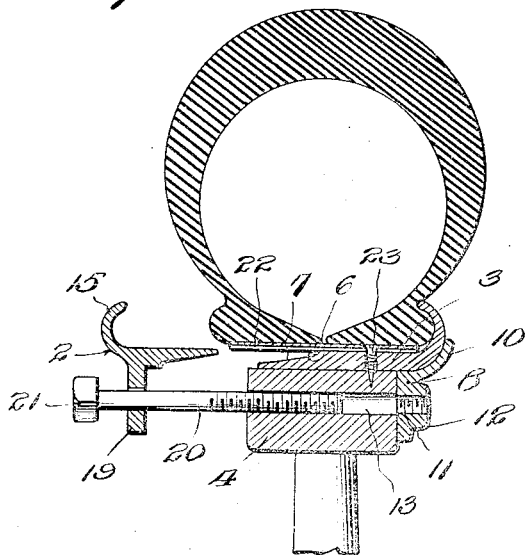
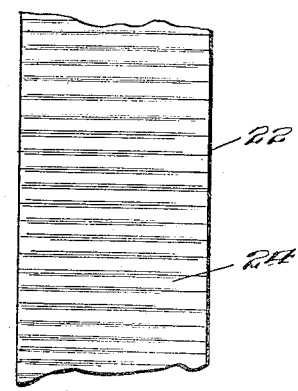
Inventor
J. W. White
by Jno. Quinn
Attorney

UNITED STATES PATENT OFFICE.

JOHN WESLEY WHITE, OF LEWISTOWN, MONTANA, ASSIGNOR OF ONE-HALF TO WILLIAM D. ROSE, OF LEWISTOWN, MONTANA.

SECTIONAL WHEEL-RIM.

1,340,094.

Specification of Letters Patent.  Patented May 11, 1920.

Application filed June 27, 1919. Serial No. 307,078.

*To all whom it may concern:*

Be it known that I, JOHN WESLEY WHITE, citizen of the United States, residing at Lewistown, in the county of Fergus and State of Montana, have invented certain new and useful Improvements in Sectional Wheel-Rims, of which the following is a specification.

This invention relates to an improvement in sectional wheel rims to receive and securely hold any desired type of separable tire.

The improved rim is constructed in two sections, one having a fixed definite relation to the wheel felly and the other adapted for adjustable connection with such fixed section, each rim having flanges to engage the tire beads. The coöperation of the section of the rim being separable and adjustable, permits a proper setting of the tire on the fixed section and the final adjustment of the removable section to properly secure such tire to thereby avoid all objectional wear incident to the placing of the tire on the usual wheel-fixed rim or one piece demountable rim.

The invention also contemplates a means for preventing creeping of the tire in use, such result being secured by the use of a specially-formed strip secured to and forming part of the fixed section of the rim, and which strip also provides a base for the entire support of the tire during application of the removable section of the rim.

In the drawings:—

Figure 1 is a view in elevation of a wheel with the improved rim in place.

Fig. 2 is a similar view from the opposite side.

Fig. 3 is a broken transverse section of the rim and applied tire with the parts fully assembled.

Fig. 4 is a similar view, showing the tire applied and the separable section in initial position of application but not fully seated.

Fig. 5 is a broken plan, showing particularly the strip for preventing creeping of the tire.

The improved rim is here shown as comprising a fixed section 1 and a removable or clamping section 2. The fixed section comprises a base wall 3 adapted to fit snugly on the surface of the wheel felly 4. One edge of the section 1, herein termed the outer edge, is formed to provide a heavy clencher type of flange 5, and the opposite or inner edge, is reduced in thickness, providing a shoulder 6, from which the section 1, extends to substantially the proximate edge of the wheel felly as an inclined or gradually reduced bearing edge 7.

Secured to that edge of the wheel felly 5 underlying the flange edge of the section 1, is an annular band 8, adapted to rest squarely against and appropriately secured, as by screws 9, to the outer surface of the felly. Supporting lips 10 extend from the upper edge of the band, such lips underlying and conforming to the flange 5. At appropriate points the band 8 is formed with bolt openings 11, and interiorly threaded enlargements in the form of bolt-nuts 12, are secured to or formed integral with the band in line with the openings 11. Bolt openings 13 in line with the bolt-openings 11 extend through the felly 5.

The clamping section 2 comprises an annular member 14 conforming in diameter to the section 1, and having on its outer edge a heavy clencher-type flange 15. The inner edge of the section 2 is reduced on its lower surface to form a shoulder 16 corresponding to the shoulder 6, and from which shoulder the section extends inwardly in a bearing edge 17, inclined reversely with respect to the bearing edge 7. The bearing edges 7 and 17, thus slidably coöperate for an interfit that will maintain the upper surfaces of the sections 1 and 2 substantially even. The section 2 is formed with depending ears 18 having bolt openings 19 adapted to aline with the openings 13 in the felly when the sections are assembled in proper relation, and bolts 20 are provided with comparatively long threaded portions to engage the nut-enlargements 12 of the band 8. The beaded ends 21 of the bolts bear against the ears 18, so that the sections 1 and 2 may be adjusted toward each other to the extent desired by proper adjustment of the bolts.

An anti-creeping strip 22 is secured to the base wall of the section 1, as by screws 23, this strip being transversely corrugated at 24, so that when the tire casing is under pressure such corrugations bite into the same to an extent to absolutely prevent creeping. The strip 22 is substantially of the full width of the base wall of the rim when in tire-holding relation, so that said strip forms a rest or support on which the tire may be placed and held during application.

The improved rim may be readily adjusted to accommodate tires of different form, such for example, as the ordinary clencher-type, straight-side, solid or cushion type and so forth. This result is gained by the possibility of adjusting the sections so as to properly hold any type of tire.

The anti-creeping strip supports the full tire in its initial application, thus permitting the positioning of the tire exactly as desired, without pinching or displacement of the inner tube. Furthermore the corrugations of such strip provide recesses beneath the tire bead into which cup grease or other filler may be introduced to absolutely seal the tire junction with the rim against the admission of moisture, dirt, or the like.

The rim readily adapts itself to the use of an improved inner tube illustrated particularly in Fig. 3. This tube 50 is so heavily constructed, that is in fabric and rubber construction, that the tube, when inflated to that degree designed for a tire of the particular size, as 80 pounds in a four-inch tire, will assume a proper size for such tire, that is will inflate to proper tire size under appropriate pressure.

This tube when positioned on the improved rim will provide the tire proper, as the casing will, through the peculiar formation of the rim, be drawn around and into contact with such inflated tube, but without sufficient force to be responsive to the pressure from within the tube. The tube alone thus carries the pressure, and the casing merely protects the tube, and is free of the pressure therein. This adaptability is entirely due to the fact that the rim permits the casing to be drawn about the tube with just the pressure desired.

Claims:—

1. In combination with a felly having a series of openings therein, a rim section fitting on and secured to the felly and having a tire engaging flange, a section fitting upon said rigid section and having a tire engaging flange and depending perforated ears in line with the openings of the felly and resting against one side of the felly, a band resting against the other side of the felly and having lips supporting the tire engaging flange of said rigid section, and also having threaded openings in line with the openings of said felly, and clamping bolts passing through the perforated ears of the movable section and the openings of the felly and engaging the threaded openings of the band.

2. In combination with a felly having a series of openings therein, a rim section fitting on and secured to the felly and having a tire engaging flange, a section fitting upon said rigid section and having a tire engaging flange and depending perforated ears in line with the openings of the felly and resting against one side of the felly, a band resting against the other side of the felly and having lips supporting the tire engaging flange of said rigid section and also having theaded openings in line with the openings of said felly, and clamping bolts passing through the perforated ears of the movable section and the openings of the felly and engaging the threaded openings of the band, and an anti-creeper strip disposed between the tire and rigid and movable sections and secured to the felly and rigid section.

In testimony whereof I affix my signature
J. WESLEY WHITE.